US009718541B2

(12) United States Patent
Darrow, Jr. et al.

(10) Patent No.: US 9,718,541 B2
(45) Date of Patent: Aug. 1, 2017

(54) SWASHPLATE APPARATUS (71) Applicant: Sikorsky Aircraft Corporation, Stratford, CT (US)

(72) Inventors: David A. Darrow, Jr., Stratford, CT (US); Stephen V. Poulin, Milford, CT (US); Frank P. D'Anna, Seymour, CT (US); Frederick J. Miner, Barkhamsted, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/914,583

(22) PCT Filed: Jun. 23, 2014

(86) PCT No.: PCT/US2014/043590
§ 371 (c)(1),
(2) Date: Feb. 25, 2016

(87) PCT Pub. No.: WO2015/047494
PCT Pub. Date: Apr. 2, 2015

(65) Prior Publication Data
US 2016/0200435 A1 Jul. 14, 2016

Related U.S. Application Data (60) Provisional application No. 61/987,845, filed on May 2, 2014, provisional application No. 61/871,053, filed on Aug. 28, 2013.

(51) Int. Cl.
*F16H 23/00* (2006.01)
*B64C 27/10* (2006.01)
*B64C 27/605* (2006.01)

(52) U.S. Cl.
CPC .......... *B64C 27/10* (2013.01); *B64C 27/605* (2013.01)

(58) Field of Classification Search
CPC ................. B64C 27/605; B64C 27/10; B64C 2027/7294; B64C 2027/7255; B64C 2027/7238
See application file for complete search history.

(56) References Cited

U.S. PATENT DOCUMENTS

| 2,549,313 A | 4/1951 | Johnson |
| 3,031,017 A | 4/1962 | Arcidiacono |

(Continued)

FOREIGN PATENT DOCUMENTS

FR  2917709 A1  12/2008

OTHER PUBLICATIONS

International Search Report and Written Opinion Issued on Mar. 3, 2015 in correspdonding PCT Application No. PCT/US2014/043590.

(Continued)

*Primary Examiner* — William Kelleher
*Assistant Examiner* — Jake Cook
(74) *Attorney, Agent, or Firm* — Cantor Colburn LLP (57) ABSTRACT

A swashplate apparatus is provided and includes a first swashplate including outer and inner bodies and an intermediate portion defining a major groove between the outer and inner bodies, a second swashplate disposable in the major groove to be rotatable relative to the first swashplate, the second swashplate including an interior facing surface radially separated from the inner body to define a minor groove and defining a recess in which the rod end is disposable, a connector disposable in the recess to pivotably couple the rod end to the second swashplate and a plate element disposable in the minor groove and affixable to the (Continued)

interior facing surface of the second swashplate and the connector.

15 Claims, 7 Drawing Sheets

(56) References Cited

U.S. PATENT DOCUMENTS

| | | | |
|---|---|---|---|
| 3,729,272 A * | 4/1973 | Lemont | B64C 27/605 416/114 |
| 3,841,586 A | 10/1974 | Broadley et al. | |
| 3,972,491 A * | 8/1976 | Ferris | B64C 27/50 244/17.27 |
| 4,573,873 A * | 3/1986 | Yao | B64C 27/59 416/114 |
| 4,804,315 A | 2/1989 | Ferris et al. | |
| 4,952,120 A * | 8/1990 | Aubry | B64C 27/72 416/114 |
| 5,431,540 A | 7/1995 | Doolin et al. | |
| 5,785,497 A | 7/1998 | White et al. | |
| 5,810,562 A | 9/1998 | Byrnes et al. | |
| 6,231,005 B1 * | 5/2001 | Costes | B64C 27/605 244/17.25 |
| 6,325,326 B1 * | 12/2001 | Pancotti | B64C 27/605 244/17.25 |
| 6,886,777 B2 | 5/2005 | Rock | |
| 7,118,340 B2 | 10/2006 | D'Anna | |
| 7,841,829 B2 | 11/2010 | Schmaling et al. | |
| 7,988,089 B2 | 8/2011 | Wittmer | |
| 8,303,248 B2 | 11/2012 | Cabrera et al. | |
| 2007/0128037 A1 | 6/2007 | Schmaling et al. | |
| 2011/0097208 A1 | 4/2011 | Girard | |
| 2011/0211953 A1 | 9/2011 | Stille | |

OTHER PUBLICATIONS

EP Communication; Extended European Search Report; Application No. 14847160.0-1754/3038912 PCT/US2014043590; dated Mar. 29, 2017; pp. 1-7.

* cited by examiner

SWASHPLATE APPARATUS

CROSS-REFERENCE TO RELATED APPLICATIONS

This application claims the benefit of PCT Application No. US2014/043590, which was filed on Jun. 23, 2014 and claims priority to U.S. Provisional Patent Application No. 61/987,845, which was filed on May 2, 2014, and to U.S. Provisional Patent Application No. 61/871,053, which was filed on Aug. 28, 2013. The entire contents of PCT Application No. US2014/043590 and U.S. Provisional Patent Application Nos. 61/987,845 and 61/871,053 are incorporated herein by reference.

FEDERAL RESEARCH STATEMENT

This invention was made with government support under Technology Investment Agreement W911W6-13-2-0003 with the United States Army. The government has certain rights in the invention.

BACKGROUND OF THE INVENTION

The subject matter disclosed herein relates to a swashplate apparatus and, more particularly, to a compact swashplate apparatus by which a control rod is attached to a rotating swashplate.

Modern aircraft, such as a helicopter having a single main rotor or coaxial counter-rotating main rotors and a tail rotor or propeller, typically include a swashplate apparatus at the main rotor (or the coaxial counter-rotating main rotors). The swashplate apparatus includes a non-rotating swashplate and a rotating swashplate that are coupled with one another to permit the rotating swashplate to be driven by the main rotor about a rotational axis. The coupled swashplates can move up and down and tilt to permit the individual blades of the main rotor to be pitched about their respective pitching axes.

The swashplate apparatus is often heavy due to the need to couple pitch control rods to the rotating swashplate, which causes the rotating swashplate and the non-rotating swashplate to have large diameters. Moreover, since the swashplate apparatus is provided within the main rotor support system of the aircraft and may be positioned at or near the top of the airframe of the aircraft, the large diameter of the swashplate apparatus acts as a drag generating feature of the aircraft.

BRIEF DESCRIPTION OF THE INVENTION

According to one aspect of the invention, a swashplate apparatus is provided and includes a first swashplate including outer and inner bodies and an intermediate portion defining a major groove between the outer and inner bodies, a second swashplate disposable in the major groove to be rotatable relative to the first swashplate, the second swashplate including an interior facing surface radially separated from the inner body to define a minor groove and defining a recess in which the rod end is disposable, a connector disposable in the recess to pivotably couple the rod end to the second swashplate and a plate element disposable in the minor groove and affixable to the interior facing surface of the second swashplate and the connector.

In accordance with embodiments, or as an alternative, the inner body includes a uniball element.

In accordance with embodiments, or as an alternative, the swashplate apparatus further includes a bearing element configured to rotatably support the second swashplate in the major groove.

In accordance with embodiments, or as an alternative, the rod end is pivotably coupled to the second body in a plane of the first swashplate.

In accordance with embodiments, or as an alternative, a distance between the interior facing surface of the second swashplate and the inner body is substantially greater than a thickness of the plate element and a distance between the interior facing surface of the second swashplate and the inner body is greater than a thickness of the rod end.

In accordance with embodiments, or as an alternative, the plate element and the rod end are removable from the second swashplate by an initial inward radial movement in the minor grove and a subsequent axial movement out of the minor groove.

In accordance with embodiments, or as an alternative, the second swashplate is formed to define multiple recesses, each of the multiple recesses is associated with a corresponding one of multiple connectors to pivotably couple a corresponding one of multiple rod ends to the second swashplate, and each of the multiple recesses is associated with a corresponding one of multiple plate elements disposable in the minor groove and affixable to the interior facing surface of the second swashplate and the corresponding one of the multiple connectors.

According to yet another aspect of the invention, a swashplate apparatus is provided and includes a non-rotating swashplate including outer and inner bodies and an intermediate portion defining a major groove between the outer and inner bodies, a rotating swashplate disposable in the major groove to be rotatable relative to the non-rotating swashplate, the rotating swashplate including a rotatable body having an interior facing surface radially separated from the inner body to define a minor groove and defining multiple recesses in which rod ends are respectively disposable, multiple connectors respectively disposable in each of the multiple recesses to pivotably couple the rod ends to the rotatable body and multiple plate elements respectively disposable in the minor groove and affixable to the interior facing surface of the rotatable body and each of the multiple connectors.

In accordance with embodiments, or as an alternative, the inner body includes a uniball element.

In accordance with embodiments, or as an alternative, the swashplate apparatus further includes a bearing element configured to rotatably support the rotating swashplate in the major groove.

In accordance with embodiments, or as an alternative, each of the rod ends is pivotably coupled to the rotatable body in a plane of the non-rotating swashplate.

In accordance with embodiments, or as an alternative, a distance between the interior facing surface of the rotatable body and the inner body is substantially greater than a thickness of each of the multiple plate elements and a distance between the interior facing surface of the rotatable body and the inner body is greater than a thickness of the rod ends.

In accordance with embodiments, or as an alternative, the multiple plate elements and the rod ends are removable from the rotatable body by an initial inward radial movement in the minor grove and a subsequent axial movement out of the minor groove.

These and other advantages and features will become more apparent from the following description taken in conjunction with the drawings. Technical effects include a swashplate having a reduced weight and size and a correspondingly reduced effect on the aerodynamic drag of the aircraft.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

With reference to FIGS. 1-6, a swashplate apparatus 10 of an aircraft 1 according to aspects of the invention has a reduced weight and size and a correspondingly reduced effect on the aerodynamic drag of the aircraft. The aircraft 1 may be, for example, a helicopter having a single main rotor or coaxial counter-rotating main rotors 2 and a tail rotor or propeller 3. The swashplate apparatus 10 may be provided in the support system of the main rotor (or the coaxial counter-rotating main rotors 2). The swashplate apparatus 10 permits the main rotor (or the coaxial counter-rotating main rotors 2) to be driven to rotate about a rotational axis and permits the individual blades of the main rotor (or the individual blades of the coaxial counter-rotating main rotors 2) to be pitched about their respective pitching axes.

Figure 1:
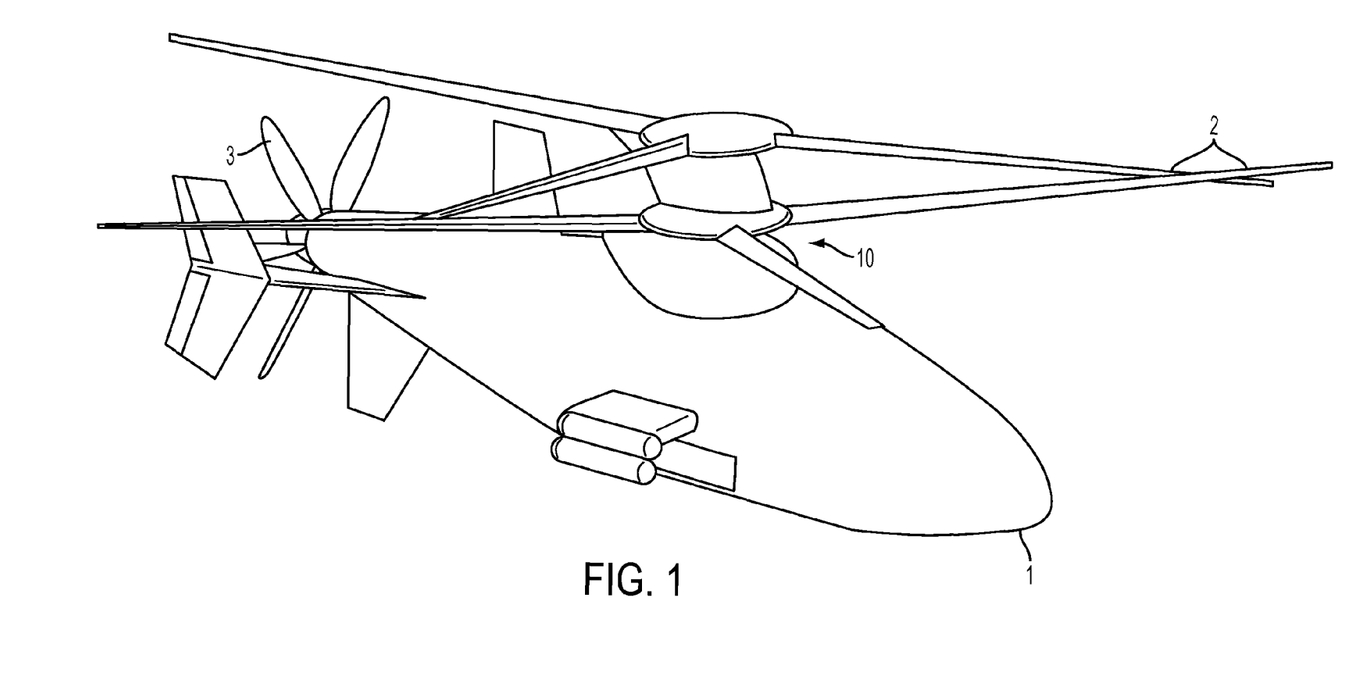
FIG. 1 is a perspective view of an aircraft in accordance with embodiments.
Figure 2:
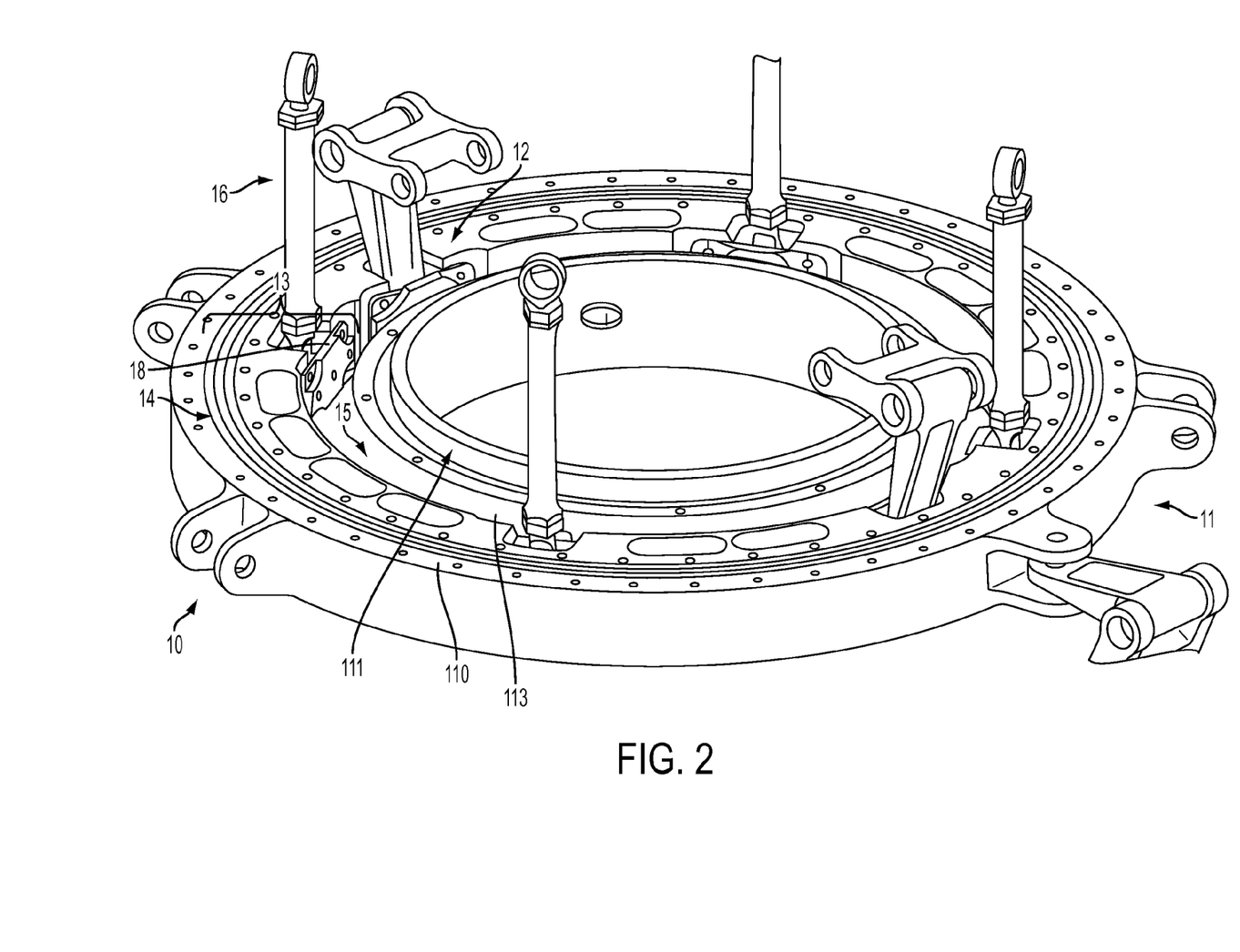
FIG. 2 is a perspective view of a swashplate apparatus in accordance with embodiments.
Figure 3:
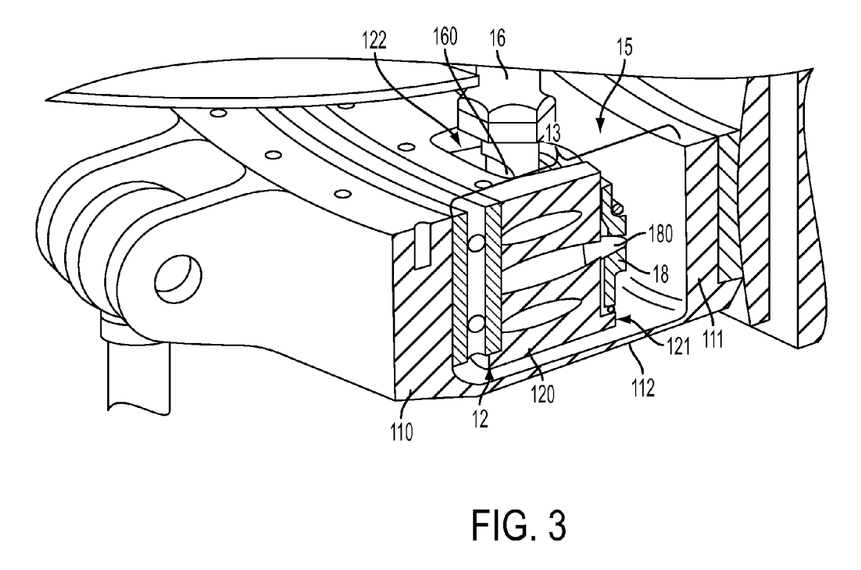
FIG. 3 is a cutaway view of a portion of the swashplate apparatus of FIG. 2.
Figure 4:
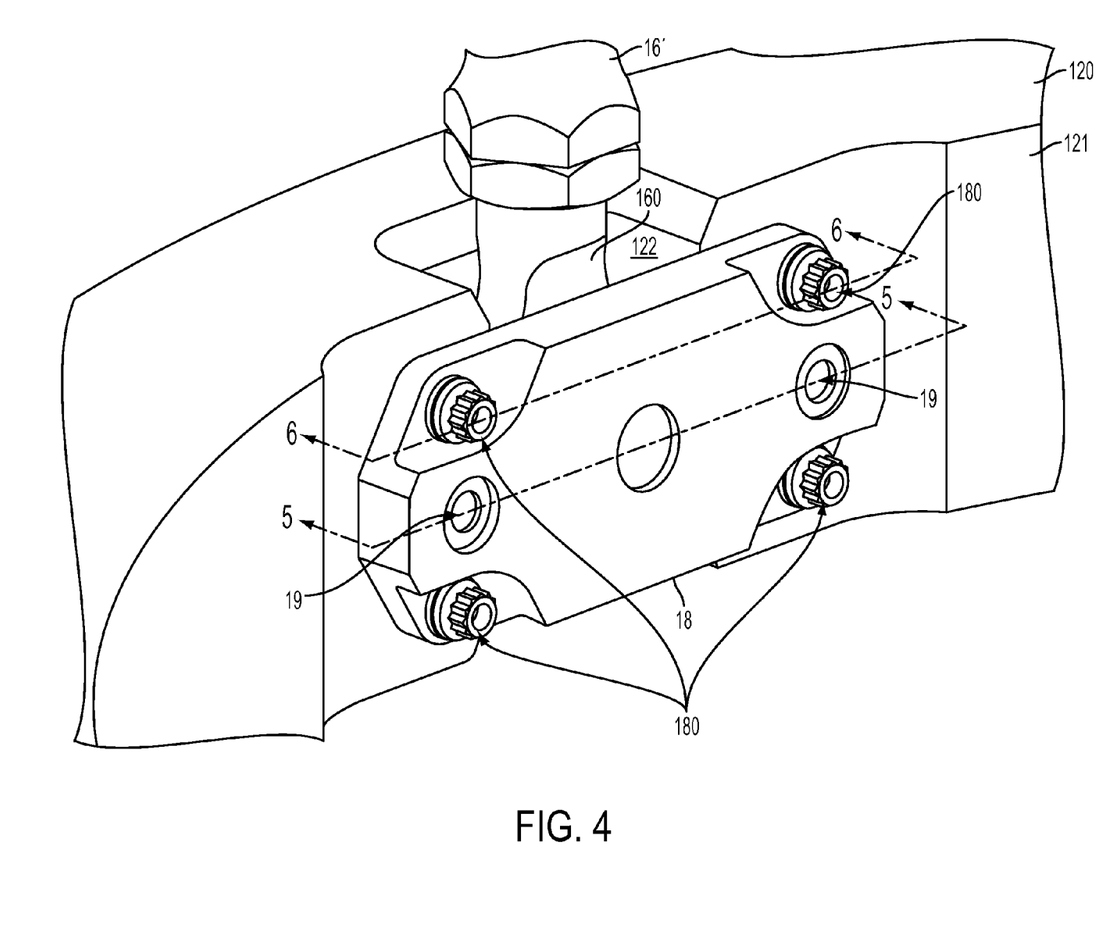
FIG. 4 is another perspective view of the portion of the swashplate apparatus of FIG. 2.

With reference to FIGS. 2-4, the swashplate apparatus 10 includes a first or non-rotating swashplate 11 and a second or rotating swashplate 12. The non-rotating swashplate 11 includes an outer annular body 110, an inner annular body 111 and an intermediate portion 112. The intermediate portion 112 extends from an interior facing surface of the outer annular body 110 to an exterior facing surface of the inner annular body 111 and is formed to define a major groove 13 between the outer annular body 110 and the inner annular body 111. The major groove 13 is thus delimited by the interior facing surface of the outer annular body 110, the exterior facing surface of the inner annular body 111 and an upper surface of the intermediate portion 112.

In accordance with embodiments, the inner annular body 111 may include a uniball bearing element. As such, the inner annular body 111 may be disposed to surround a rounded element (not shown) and to move in various directions about the rounded element.

The rotating swashplate 12 is disposable in the major groove 13 to be rotatable relative to the non-rotating swashplate 11. To this end, the swashplate apparatus 10 may further include a bearing element 14, such as a duplex bearing, which is disposed between the interior facing surface of the outer annular body 110 and a complementary portion of the rotating swashplate 12. The bearing element 14 is thus configured to rotatably support the rotating swashplate 12 in the major groove 13.

The rotating swashplate 12 includes a rotatable annular body 120. The rotatable annular body 120 has an interior facing surface 121 that is radially separated from the exterior facing surface of the inner annular body 111 to define a minor groove 15. The rotatable annular body 120 also defines a recess 122 in which an end 160 of a rod 16, such as a pitch control rod, is disposable. The end 160 may include an annular ring-shaped member that is coupled to an elongate member extendible away from the swashplate apparatus 10.

Figure 5:
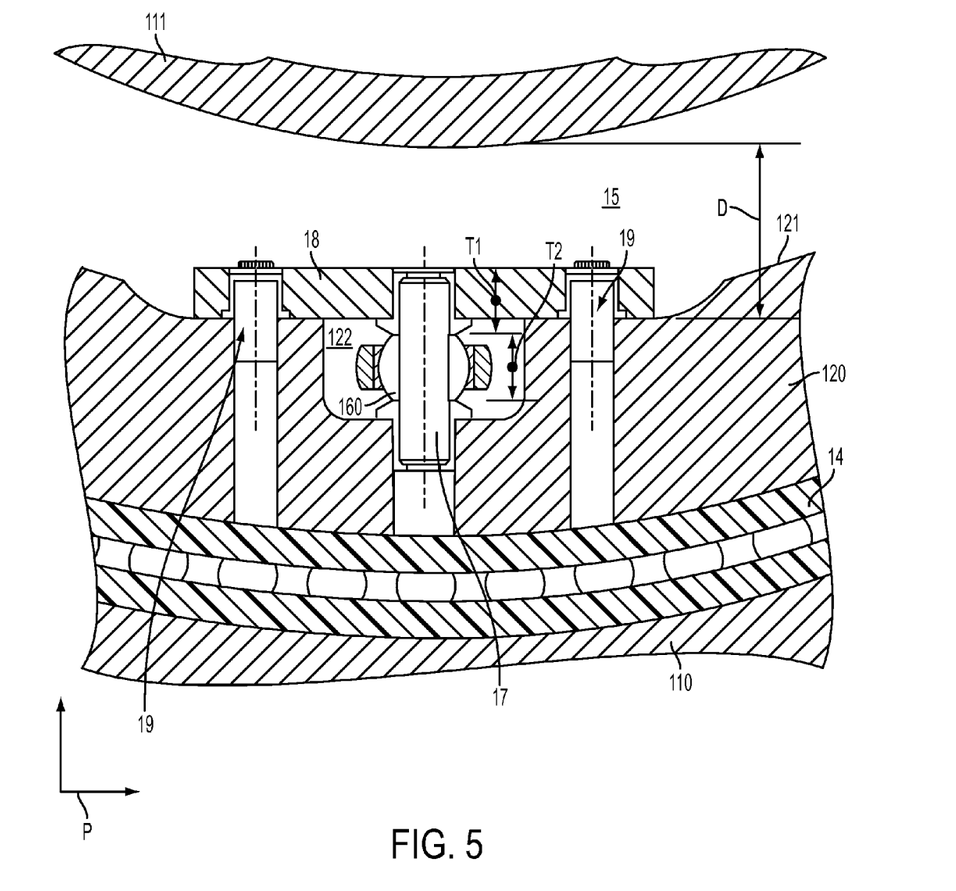
FIG. 5 is a top down view of the portion of the swashplate apparatus of FIG. 2 taken along line 5-5 of FIG. 4.
Figure 6:
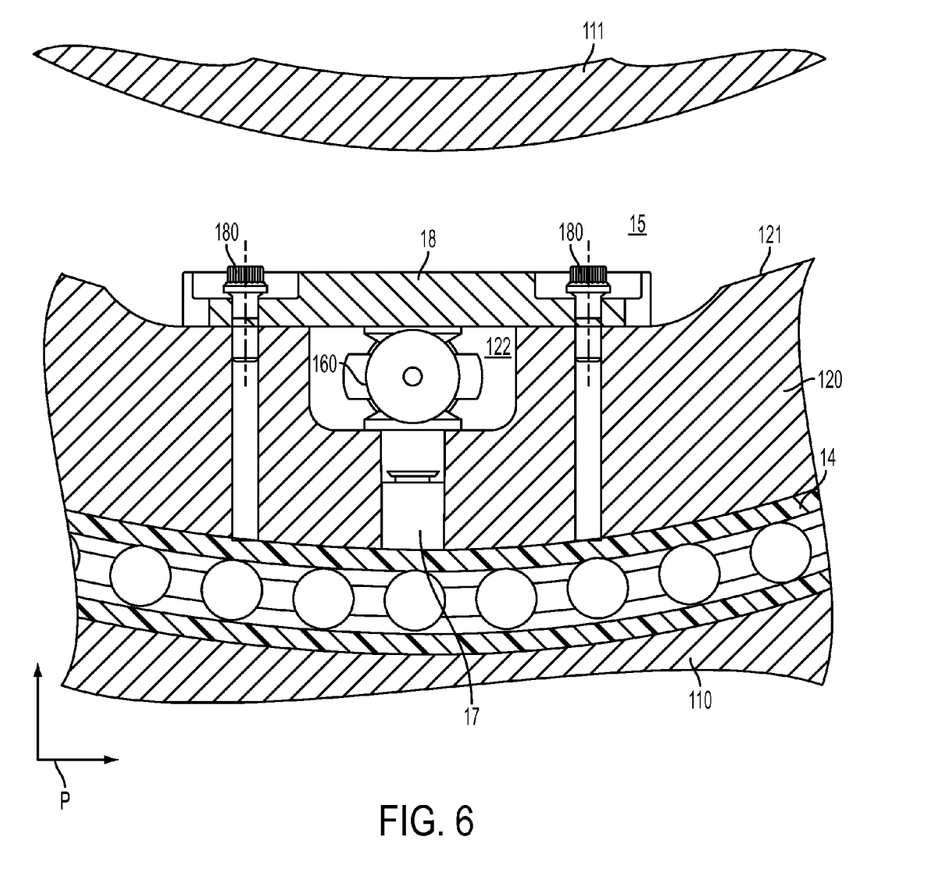
FIG. 6 is a top down view of the portion of the swashplate apparatus of FIG. 2 taken along line 6-6 of FIG. 4.

The swashplate apparatus 10 further includes a connector pin 17 and a plate element 18. The connector pin 17 is disposable in the recess 122 of the rotatable annular body 120 to pivotably couple the end 160 of the rod 16 to the rotatable annular body 120 in a plane P of the non-rotating swashplate 11 (see FIGS. 5 and 6). The plate element 18 is disposable in the minor groove 15 and is affixable to the interior facing surface 121 of the rotatable annular body 120 by fastening elements 180, such as threaded screws, and to the connector pin 17. In accordance with embodiments, the plate element 18 may be coupled with an end of the connector pin 17 by a bearing element with the fastening elements 180 maintaining the connection. Load transfer pins 19 may be provided along a mid-line of the plate 18 to provide for load transfer capability between the plate element 18 and the rotatable annular body 120. To this end, as shown in FIGS. 4 and 5, two or more load transfer pins 19 extend through the rotatable annular body 120 and the plate element 18 at least at opposite circumferential sides of the plate element 18.

With the configuration and construction described above, the end 160 of the rod 16 is pivotably coupled to the connector pin 17 and locked in the recess 122 by the connector pin 17 and the plate element 18. More particularly, the end 160 of the rod 16 is locked in the recess 122 in an axial dimension and a circumferential dimension by the interference between the connector pin 17 and the annular ring-shaped member. The end 160 of the rod 16 is also locked in a radial dimension by the interference between the annular ring-shaped member and a radially outward side of the recess 122 and the plate element 18.

In accordance with embodiments, a distance D between the interior facing surface 121 of the rotatable annular body 120 and the exterior facing surface of the inner annular body 111 is substantially greater than a thickness T1 of the plate element 18. In addition, the distance D between the interior facing surface 121 of the rotatable annular body 120 and the exterior facing surface of the inner annular body 111 is greater than a thickness T2 of the end 160 of the rod 16.

Figure 7:
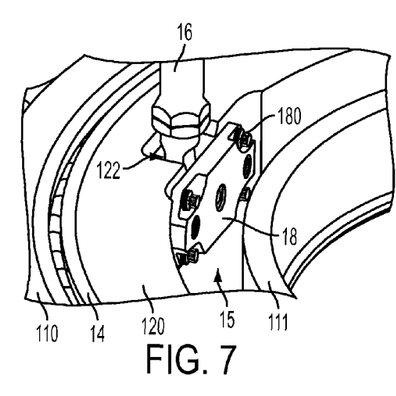
FIG. 7 is a perspective view of the portion of the swashplate apparatus of FIG. 2 at an initial stage.
Figure 8:
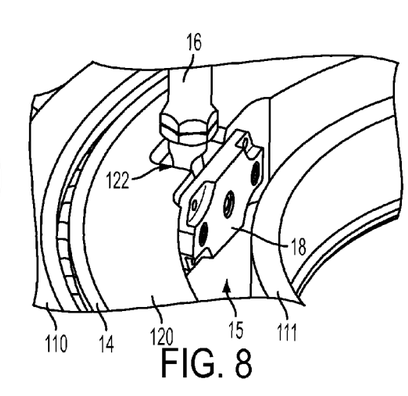
FIG. 8 is a perspective view of the portion of the swashplate apparatus of FIG. 2 at a second stage.
Figure 9:
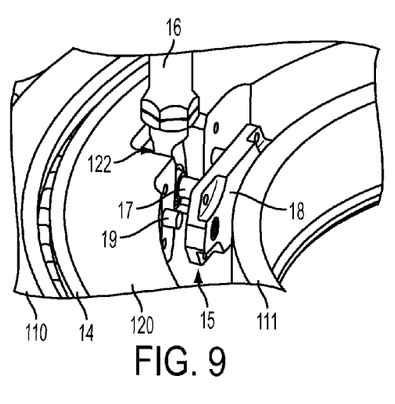
FIG. 9 is a perspective view of the portion of the swashplate apparatus of FIG. 2 at a third stage.
Figure 10:
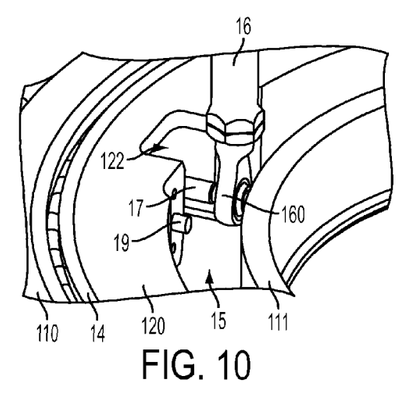
FIG. 10 is a perspective view of the portion of the swashplate apparatus of FIG. 2 at a fourth stage.

Thus, with reference to FIGS. 7-10, during disassembly of the swashplate apparatus 10 (i.e., for repair, maintenance, service, etc.), the fastening elements 180 are released to free the plate element 18 from the interior facing surface 121 of the rotatable annular body 120 (see FIG. 7). The plate element 18 is then removable from the rotatable annular body 120 by an initial inward radial movement guided by the connector pin 17 and the load transfer pins 19 along the radial dimension in the minor groove 15 (see FIGS. 8 and 9) and by a subsequent axial movement out of the minor groove 15 and away from the upper surface of the intermediate portion 112. The end 160 of the rod 16 is then removable from the rotatable body 120 and out of the recess 122 by an initial inward radial movement guided by the connector pin 17 along the radial dimension in the minor grove 15 (see FIG. 10) and by a subsequent axial movement out of the minor groove 15 and away from the upper surface of the intermediate portion 112.

Reassembly of the swashplate apparatus 10 would proceed in an opposite manner. That is, the end 160 of the rod 16 would be axially moved into the minor groove 15 and then moved radially outwardly to engage with the connector pin 17. This would be followed by the plate element 18 being moved axially into the minor groove 15 and then moved radially outwardly to engage with the interior facing surface 121 of the rotatable annular body 120. At this point, the plate element 18 would be coupled with an end of the connector pin 17 and the load transfer pins 19 and the fastening elements 180 would be used to secure the plate element 18 to the interior facing surface 121 of the rotatable annular body 120.

In accordance with further embodiments, it will be understood that as part of the exemplary aircraft 1, the rotating swashplate 12 of the swashplate apparatus 10 may be formed to define multiple recesses 122 (e.g., four recesses 120 uniformly arrayed around the rotating swashplate 12). In this case, each of the multiple recesses 122 is associated with a corresponding one of multiple connector pins 17 to permit pivotably coupling of a corresponding one of multiple ends 160 of rods 16 to the rotatable annular body 120 such that the ends 160 of the rods 16 are each in the plane P of the non-rotating swashplate 11. In addition, each of the multiple recesses 122 is associated with a corresponding one of multiple plate elements 18 that are each disposable in the minor groove 15 and affixable to the interior facing surface 121 of the rotatable annular body 120 and the corresponding one of the multiple connector pins 17.

It is to be understood that, in the case of multiple recesses 122, multiple ends 160 of the rods 16, multiple connector pins 17 and multiple plate elements 18, the disassembly and reassembly of each unit may proceed substantially as described above.

While the invention has been described in detail in connection with only a limited number of embodiments, it should be readily understood that the invention is not limited to such disclosed embodiments. By way of example, the rotating swashplate 12 could be a stationary swashplate having the recesses 122 while the non-rotating swashplate 11 could be maintained as a rotating swashplate in other aspects. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A swashplate apparatus for use with a rod end, comprising:
   a first swashplate including outer and inner bodies and an intermediate portion defining a major groove between the outer and inner bodies;
   a second swashplate disposable in the major groove to be rotatable relative to the first swashplate, the second swashplate including an interior facing surface radially separated from the inner body to define a minor groove and defining a recess in which the rod end is disposable;
   a connector disposable in the recess to pivotably couple the rod end to the second swashplate; and
   a plate element disposable in the minor groove and affixable to the interior facing surface of the second swashplate and the connector.

2. The swashplate apparatus according to claim 1, wherein the inner body comprises a uniball element.

3. The swashplate apparatus according to claim 1, further comprising a bearing element configured to rotatably support the second swashplate in the major groove.

4. The swashplate apparatus according to claim 1, wherein the rod end is pivotably coupled to the second swashplate in a plane of the first swashplate.

5. The swashplate apparatus according to claim 1, wherein a distance between the interior facing surface of the second swashplate and the inner body is substantially greater than a thickness of the plate element.

6. The swashplate apparatus according to claim 5, wherein a distance between the interior facing surface of the second swashplate and the inner body is greater than a thickness of the rod end.

7. The swashplate apparatus according to claim 1, wherein the plate element and the rod end are removable from the second swashplate by an initial inward radial movement in the minor grove and a subsequent axial movement out of the minor groove.

8. The swashplate apparatus according to claim 1, wherein the second swashplate is formed to define multiple recesses,
   each of the multiple recesses being associated with a corresponding one of multiple connectors to pivotably couple a corresponding one of multiple rod ends to the second swashplate, and
   each of the multiple recesses being associated with a corresponding one of multiple plate elements disposable in the minor groove and affixable to the interior facing surface of the second swashplate and the corresponding one of the multiple connectors.

9. A swashplate apparatus for use with rod ends, the swashplate apparatus comprising:
   a non-rotating swashplate including outer and inner bodies and an intermediate portion defining a major groove between the outer and inner bodies;
   a rotating swashplate disposable in the major groove to be rotatable relative to the non-rotating swashplate, the rotating swashplate including a rotatable body having an interior facing surface radially separated from the inner body to define a minor groove and defining multiple recesses in which the rod ends are respectively disposable;
   multiple connector pins respectively disposable in each of the multiple recesses to pivotably couple the rod ends to the rotatable body; and
   multiple plate elements respectively disposable in the minor groove and affixable to the interior facing surface of the rotatable body and each of the multiple connectors.

10. The swashplate apparatus according to claim 9, wherein the inner body comprises a uniball element.

11. The swashplate apparatus according to claim 9, further comprising a bearing element configured to rotatably support the rotating swashplate in the major groove.

12. The swashplate apparatus according to claim 9, wherein each of the rod ends is pivotably coupled to the rotatable body in a plane of the non-rotating swashplate.

13. The swashplate apparatus according to claim 9, wherein a distance between the interior facing surface of the rotatable body and the inner body is substantially greater than a thickness of each of the multiple plate elements.

14. The swashplate apparatus according to claim 13, wherein a distance between the interior facing surface of the rotatable body and the inner body is greater than a thickness of the rod ends.

15. The swashplate apparatus according to claim 9, wherein the multiple plate elements and the rod ends are removable from the rotatable body by an initial inward radial movement in the minor grove and a subsequent axial movement out of the minor groove.

* * * * *